United States Patent
Wang et al.

(10) Patent No.: US 8,078,394 B2
(45) Date of Patent: *Dec. 13, 2011

(54) INDEXING LARGE-SCALE GPS TRACKS

(75) Inventors: Longhao Wang, Beijing (CN); Yu Zheng, Beijing (CN); Xing Xie, Beijing (CN); Wei-Ying Ma, Beijing (CN)

(73) Assignee: Microsoft Corp., Redmond, WA (US)

( * ) Notice: Subject to any disclaimer, the term of this patent is extended or adjusted under 35 U.S.C. 154(b) by 818 days.

This patent is subject to a terminal disclaimer.

(21) Appl. No.: 12/037,263

(22) Filed: Feb. 26, 2008

(65) Prior Publication Data

US 2009/0216787 A1 Aug. 27, 2009

(51) Int. Cl.
*G06F 17/00* (2006.01)
(52) U.S. Cl. ............. 701/201; 707/100; 340/995.13
(58) Field of Classification Search .......... 701/201; 340/995.13; 707/100–102; 706/52; *G06F 7/00, G06F 17/30, 17/00*
See application file for complete search history.

(56) References Cited

U.S. PATENT DOCUMENTS

| | | | |
|---|---|---|---|
| 6,122,628 A * | 9/2000 | Castelli et al. ............ 707/5 |
| 6,219,662 B1 * | 4/2001 | Fuh et al. ............ 707/3 |
| 6,424,370 B1 | 7/2002 | Courtney |
| 6,618,507 B1 | 9/2003 | Divakaran et al. |
| 6,965,827 B1 | 11/2005 | Wolfson |
| 7,197,500 B1 * | 3/2007 | Israni et al. ............ 707/809 |
| 7,203,693 B2 | 4/2007 | Carlbom et al. |
| 7,281,199 B1 | 10/2007 | Nicol et al. |
| 7,389,283 B2 * | 6/2008 | Adler ............ 707/2 |
| 7,428,551 B2 * | 9/2008 | Luo et al. ............ 707/102 |
| 7,437,372 B2 * | 10/2008 | Chen et al. ............ 707/100 |
| 7,860,891 B2 * | 12/2010 | Adler et al. ............ 707/791 |
| 2002/0062193 A1 | 5/2002 | Lin |

(Continued)

FOREIGN PATENT DOCUMENTS

KR 100650389 B1 11/2006
WO 2007087615 C1 8/2007

OTHER PUBLICATIONS

Theodoridis, et al, "Spatio-Temporal Indexing for Large Multimedia Applications", In the proceedings of the IEEE-International Conference on Multimedia Systems '96, Hiroshima, Japan, pp. 1-9. http://www.dblab.ece.ntua.gr/pubs/uploads/TR-1996-5.ps.

(Continued)

*Primary Examiner* — Tuan C. To
(74) *Attorney, Agent, or Firm* — Lyon & Harr, LLP; Katrina A. Lyon (57) ABSTRACT

Described is a technology by which uploaded GPS data is indexed according to spatio-temporal relationships to facilitate efficient insertion and retrieval. The indexes may be converted to significantly smaller-sized data structures when new updates to that structure are not likely. GPS data is processed into a track of spatially-partitioned segments such that each segment has a cell. Each cell has an associated temporal index (a compressed start-end tree), into which data for that cell's segments are inserted. The temporal index may include an end time index that relates each segment's end time to a matching start time index. Given query input comprising a spatial predicate and a temporal predicate, tracks may be searched for by determining which spatial candidate cells may contain matching results. For each candidate cell, the search accesses the cell's associated temporal index to find any track or tracks that correspond to the temporal predicate.

20 Claims, 11 Drawing Sheets

U.S. PATENT DOCUMENTS

| | | | |
|---|---|---|---|
| 2003/0212689 A1* | 11/2003 | Chen et al. | 707/100 |
| 2004/0117358 A1* | 6/2004 | von Kaenel et al. | 707/3 |
| 2004/0220965 A1 | 11/2004 | Harville et al. | |
| 2005/0203927 A1 | 9/2005 | Sull et al. | |
| 2005/0231394 A1* | 10/2005 | Machii et al. | 340/995.13 |
| 2006/0155464 A1* | 7/2006 | Smartt | 701/208 |
| 2006/0178807 A1* | 8/2006 | Kato et al. | 701/117 |
| 2007/0203638 A1* | 8/2007 | Tooyama et al. | 701/200 |
| 2008/0052303 A1* | 2/2008 | Adler et al. | 707/100 |
| 2008/0228396 A1* | 9/2008 | Machii et al. | 701/209 |
| 2008/0228783 A1* | 9/2008 | Moffat | 707/100 |

OTHER PUBLICATIONS

Theodoridis, et al, "Specifications for Efficient Indexing in Spatiotemporal Databases", IEEE. Published in the Proceedings of SSDBM'98, Jul. 1-3, 1998 in Capri, Italy, pp. 1-10.

Hadjieleftheriou, et al, "Efficient Indexing of Spatiotemporal Objects", pp. 1-10.

"International Search Report", Filed Date Jan. 31, 2009, Application No. PCT/US2009/032778, pp. 1-11.

Hadhieleftheriou, et al., "Complex Spatio-Temporal Pattern Queries", Retrieved at <<http://www.vldb2005.org/program/paper/fri/p877-hadjieleftheriou.pdf>>, Proceedings of the 31st International Conference on Very Large Data Bases, Sep. 2, 2005, pp. 877-888.

Weng, et al., "Design and Implementation of Spatial Temporal Data Model in Vehicle Monitor System", Retrieved at <<http://www.geocomputation.org/2005/Weng.pdf>>, Proceedings of the 8th International Conference on GeoComputation, Jul. 31-Aug. 3, 2005, pp. 8.

* cited by examiner

INDEXING LARGE-SCALE GPS TRACKS

RELATED APPLICATIONS

This patent application is related to U.S. patent application Ser. No. 12/037,347 to Zheng et al., entitled, "System for Logging Life Experiences Using Geographic Cues," filed concurrently herewith and incorporated herein by reference; and to U.S. patent application Ser. No. 12/037,305 to Zheng et al., entitled, "Learning Transportation Modes from Raw GPS Data," filed concurrently herewith and incorporated herein by reference.

BACKGROUND

Many users of global positioning system (GPS) devices upload their GPS data (tracks) to the Internet, sometimes in conjunction with photographs and the like, such as for browsing and sharing travel and other experiences. In addition to sharing with others, users that upload their GPS tracks may benefit by having a better record of past events, which helps in reliving past events and gaining an understanding of their life patterns.

However, as more and more GPS logs are accumulated, managing and indexing the GPS data is becoming an important issue for Web applications/sites that provide the upload and retrieval service. In addition to storage considerations, users also need an efficient way to retrieve the specific GPS tracks in which they are interested. Existing search methods use text searches and tags, such as activity tags and region tags, but in general these methods are inadequate with respect to satisfying users' needs.

Attempts have been made to provide spatio-temporal search functionality to allow users to retrieve trajectories within a given spatial range over maps and a temporal interval. However, known spatio-temporal indexing schemes, such as an R-tree or its variants, are not configured particularly well with respect to handling the skewed nature of accumulated GPS tracks.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which GPS data is processed into a track of segments as partitioned by a spatial grid such that each segment has a corresponding grid cell. Each grid cell has an associated temporal index, into which data representative of each segment in that cell is inserted, including by creating an entry for that segment based on an end time of that segment and an entry based on a start time of that segment. An end time index may be used to relate each segment's end time to one of a plurality of start time indexes into which that segment's start time is entered.

In one aspect, given query input comprising a spatial predicate and a temporal predicate, tracks may be searched for by determining which spatial grid cell or cells are candidate cells for the resulting track. For each candidate cell, the search continues by accessing its associated temporal index to find any track or tracks that correspond to the temporal predicate.

In one aspect, when a temporal index has a low likelihood of being updated, that temporal index is converted from one data structure into another data structure, such as one that uses less storage space. A time of last update of the temporal index and/or update frequency data may be used to determine whether the index has a low likelihood of being updated.

In one example implementation, insertion logic builds compressed start-end trees (CSE-trees) from sets of GPS data. Search logic searches among the CSE-tress to find one or more tracks corresponding to a subset of GPS data that match a spatio-temporal input request. Compression logic may convert a compressed start-end tree from one data structure type to another based on a likelihood of each compressed start-end tree being updated according to subsequently-received GPS data. For example, a CSE-tree may be configured as a B+ tree, which the compression logic converts to a dynamic array when the likelihood of that CSE-tree being updated is low.

In one aspect, a temporal index (e.g., a CSE-tree) comprises an end time index that contains entries corresponding to a plurality of end times for segments that have common spatial relationships. The temporal index comprises a plurality of start time indexes, each start time index containing entries for start times of segments that are within a time range corresponding to that index. The temporal index may be identified relative to others based on spatial data corresponding to a track or tracks, and searched via temporal data to locate those tracks that also correspond to the temporal data.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an effective way of managing GPS data and improving user experiences with respect to interacting with that data. In one aspect, there is provided a spatio-temporal indexing scheme that uses a compressed start-end tree (CSE-tree) for managing GPS data, in which the tree structure is based on the uploading behavior of typical users to provide a balance between efficiency of access to the data and storage considerations. Also described is a stochastic process model that simulates user uploading of GPS track logs.

While the examples herein are generally directed towards the usage of B+ tree index for frequently updated data, and a sorted dynamic array for less frequently updated data, it is understood that these are only examples. For example, instead of a B+ tree, a B-tree, R-tree, binary tree and so forth may be used for frequently updated data, in general because such data structures are efficient in insertion operations, although consuming significant storage space because of relatively larger index sizes. For rarely updated data groups (e.g., where groups are differentiated by time), storage space is reduced by using a (relatively less efficient) array structure, such as a sorted dynamic array; however other arrays may be used, such as, grow-able arrays, array lists, dynamic tables and so forth.

Moreover, it can be readily appreciated that still other types of data structures may be used, and that there may be more granularity than having two alternatives. For example, a highly efficient but large-sized data structure may be used for very frequent updates, a less efficient but somewhat smaller data structure may be used for moderately frequent updates, and a still less efficient but significantly smaller data structure may be used for rarely updated data groups.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, and/or data management in general.

Figure 1:
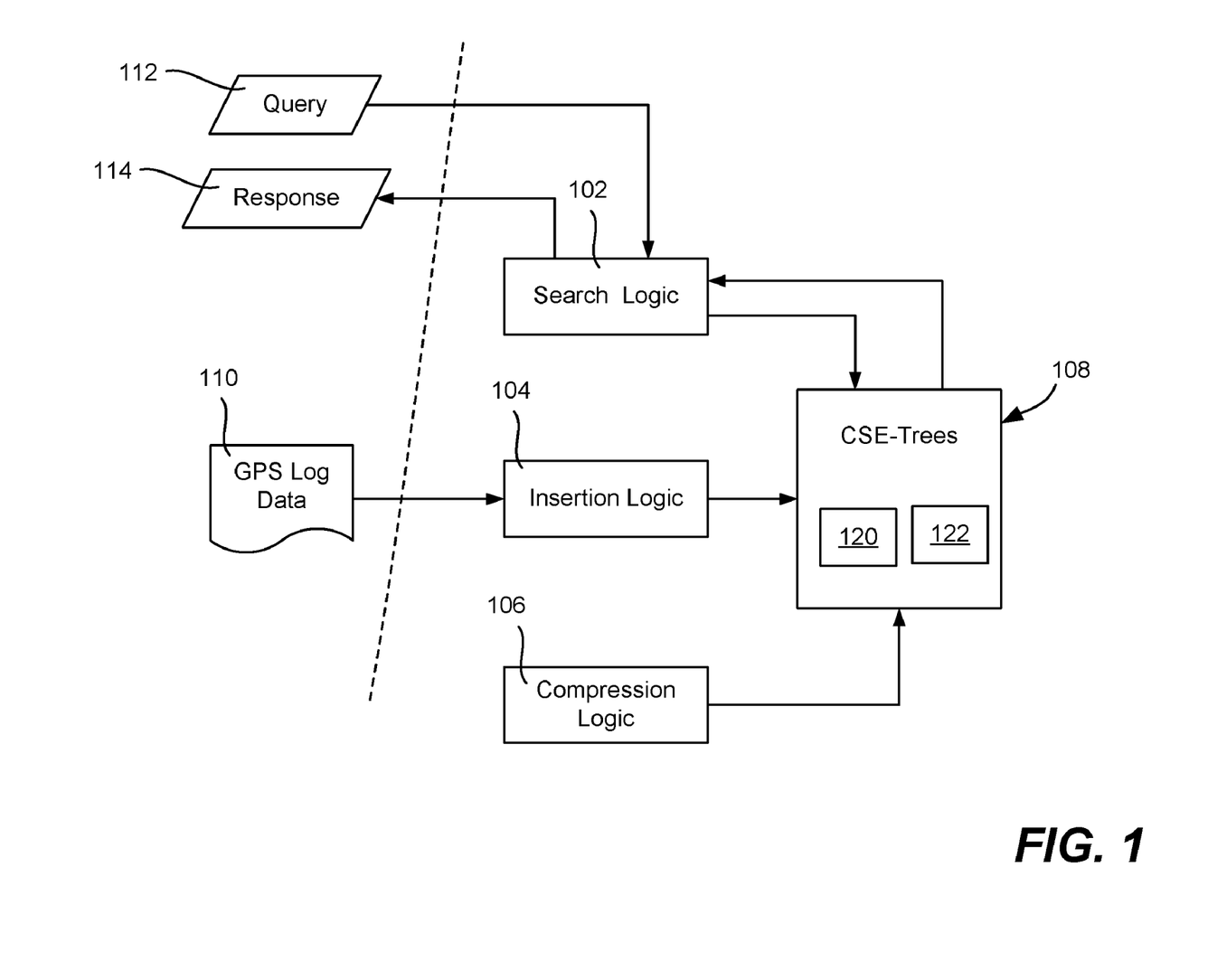
FIG. 1 is a block diagram representing example components for processing GPS data into a CSE-tree, interacting with the CSE-tree to respond to a search query, and managing the CSE-tree.

Turning to FIG. 1, there is shown a general mechanism for managing GPS data, including search logic 102, insertion logic 104 and compression logic 106, which each work with a set of compressed start-end trees (CSE-trees) 108. In general and as described below, the insertion logic 104 builds the CSE-trees 108 from GPS log data 110 by adding new GPS track segments into the CSE-trees 108. The search logic 102 accesses the CSE-trees 108 in order to provide users with access to the indexed GPS data via spatio-temporal queries (e.g., exemplified in FIG. 1 via a query 112 and response 114).

The compression logic 106 is based on observations that insertions into the index are not distributed evenly. Therefore, one type of index structure may be used for frequently updated data, with another type of structure used for rarely updated data. The compression logic 106 operates (e.g., is called by a management process) to make the conversion to a different index structure when the frequency of updates to a data structure drops below a threshold. In other words, based on update frequency (or a related criterion such as time since last update), the compression logic 106 transforms an efficient index of the CSE-trees 108 (e.g., an index of a set of B+ tree indexes 120) into a less efficient but relatively smaller structure (e.g., a sorted dynamic array of a set 122).

Figure 2:
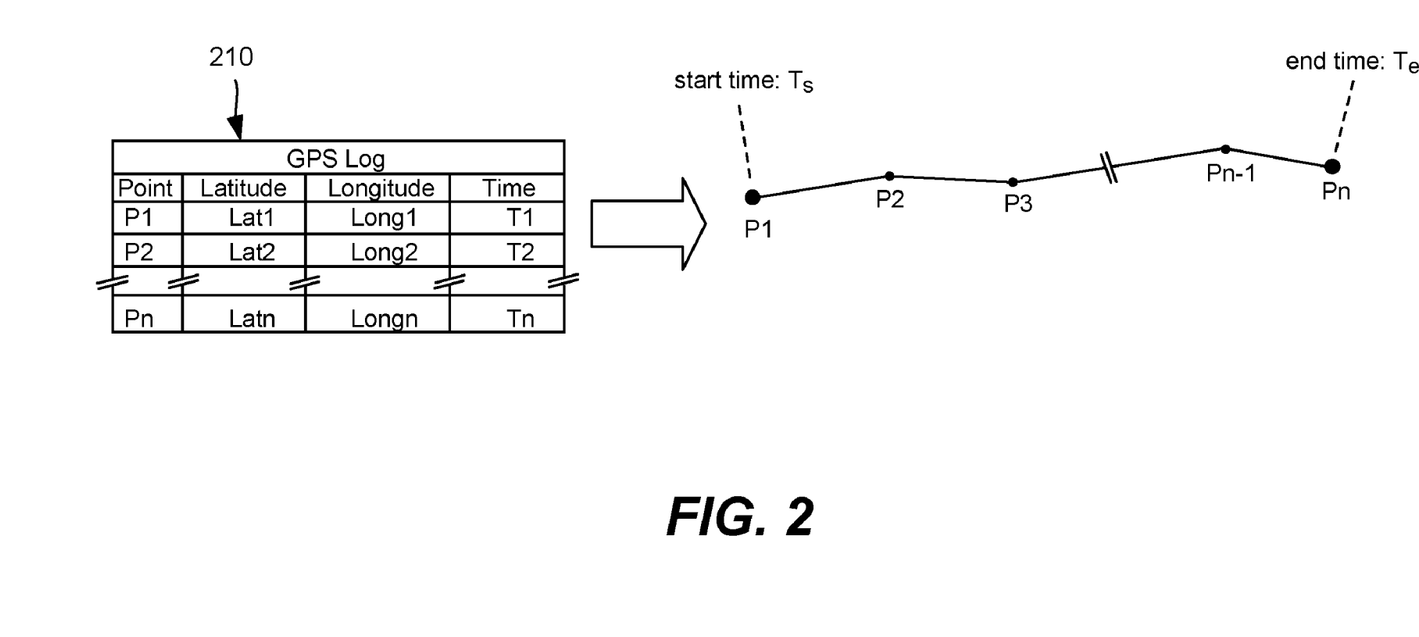
FIG. 2 is a representation of an example set of segments generated from GPS data.

FIG. 2 is a representation of a typical GPS track log 210. Each log comprises a sequence of log entries, which may be formulated as <latitude, longitude, time stamp>. Connecting these entries sequentially forms a track, as depicted in the right part of FIG. 2, with $T_s$ denoting the start time of the track, and $T_e$ denoting the end time of the track. The duration of a GPS track ($T_{dur}$) is the time interval between the end time ($T_e$) and the start time ($T_s$) of the track:

$$T_{dur} = T_e - T_s \quad (1)$$

Because the user cannot upload a track immediately after the track ends, there is a time interval between $T_e$ and the time it is uploaded onto a website ($T_{up}$). This interval is defined as $T_{int}$:

$$T_{int} = T_{up} - T_e \quad (2)$$

Figure 3:
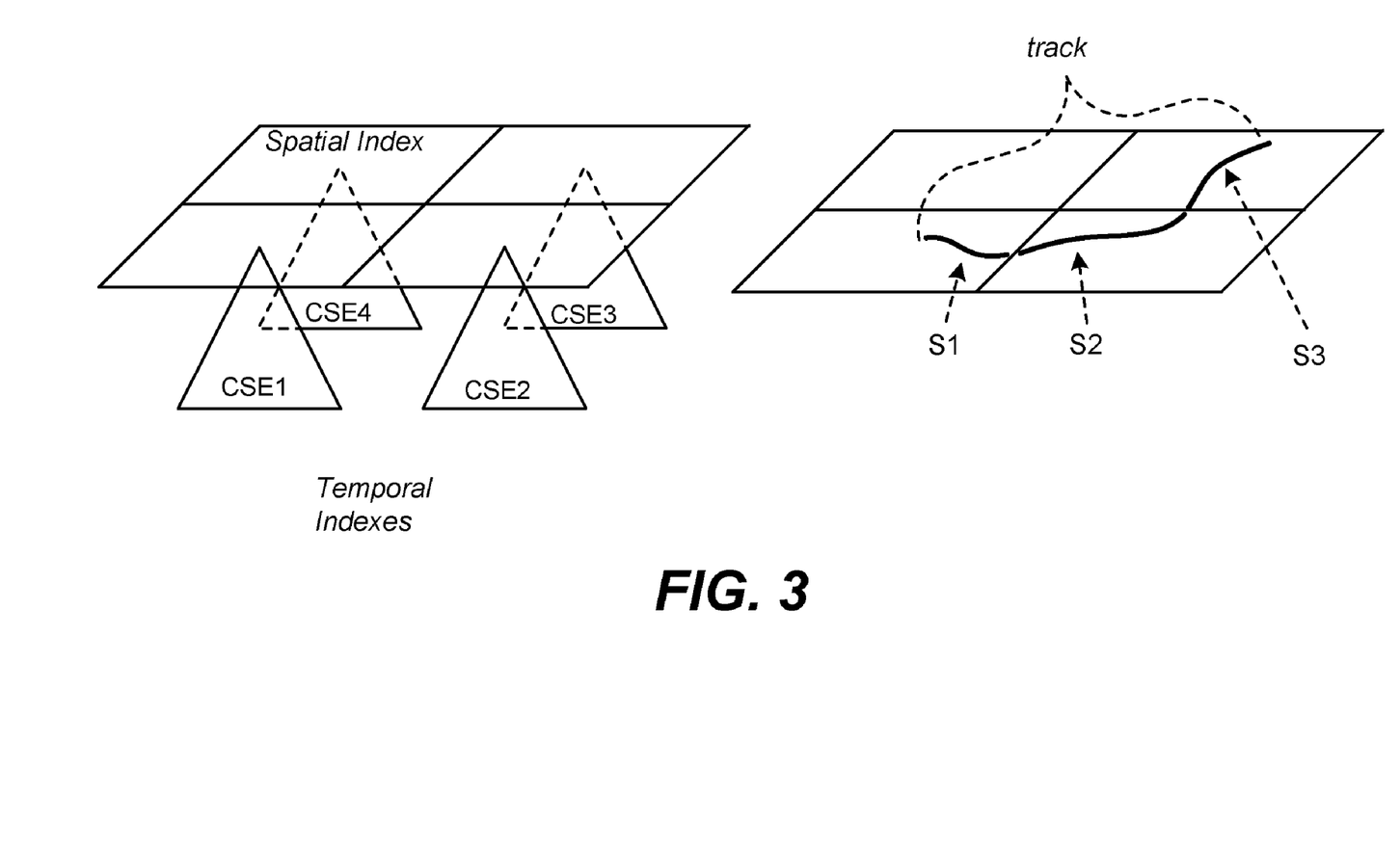
FIG. 3 is a representation of spatially-based grid cells having associated temporal indexes that maintain timing information for segments of tracks.

As described herein and generally represented in FIG. 3, there is provided a CSE-tree structure, also referred to as a temporal index, for access by GPS-data sharing applications and the like, in which the tree structure is based on the uploading behavior of typical users. In one example implementation, CSE-trees (CSE1-CSE4 are shown, although there may be any practical number) are organized by partitioning the space into disjoint spatial cells that cover an entire spatial region, and maintaining a flexible temporal index, that is, a CSE-tree, for each spatial cell. A spatial region may be partitioned into uniform cells using a grid-based indexing method, or into an uneven grid using a quad-tree indexing method.

As represented in the right side of FIG. 3 which illustrates track segmentation, to insert a new GPS track, the insertion logic 104 divides the track into segments (e.g., S1-S3) according to the spatial partitions. Then each segment is inserted into the corresponding temporal index of its associated spatial grid. In the example of FIG. 3, the segment S1 is inserted into CSE1, the segment S2 into CSE2, and the segment S3 into CSE3.

Figure 4:
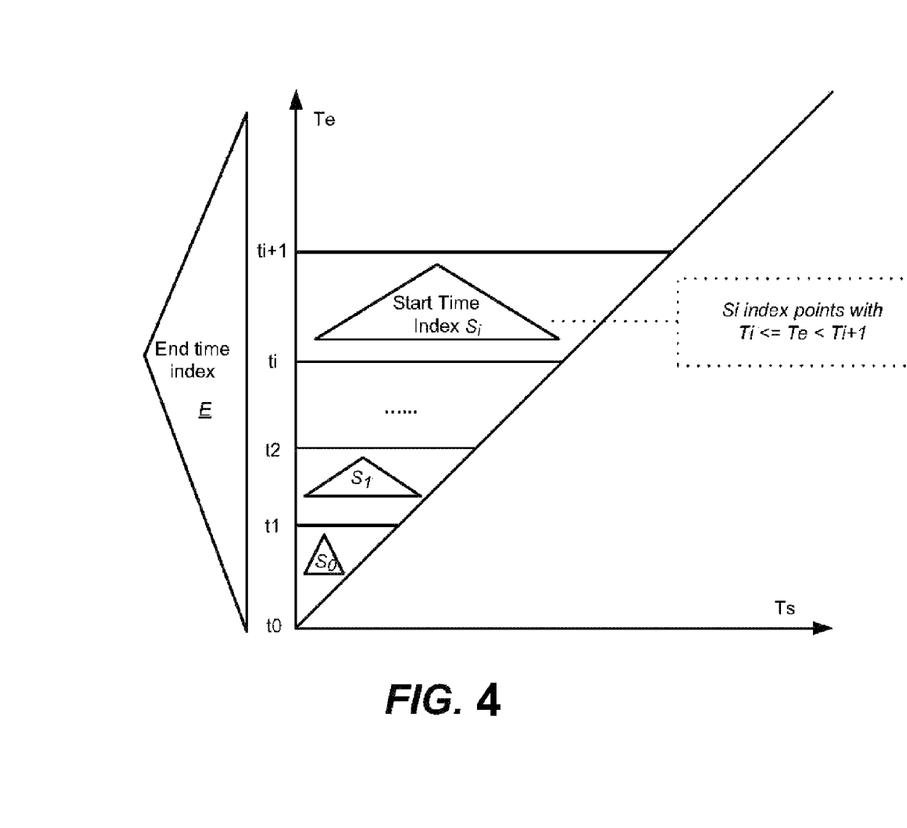
FIG. 4 is a representation of a CSE-tree arranged with an end time index and a plurality of start time indexes.

Many segments may be indexed within a CSE-tree temporal index. The overall structure of a CSE-tree is represented in FIG. 4, in which segments correspond to points (e.g., FIGS. 5A and 5B), each with a horizontal coordinate value representing the start time and a vertical coordinate value representing the end time for that segment. Because for any segment the end time $T_e$ is always greater than its start time $T_s$, the points representing the segments fall in the upper left part of the plane.

The segments in each temporal index are divided into groups according to the end time of each segment. More particularly, the points are divided into several groups (time ranges) by their respective $T_e$ values. For each group, a start time index ($S_0, S_1 \ldots S_i$) is built to index the points within that group. For the full set of groups, one end time index E is built to index the different groups.

Figure 6:
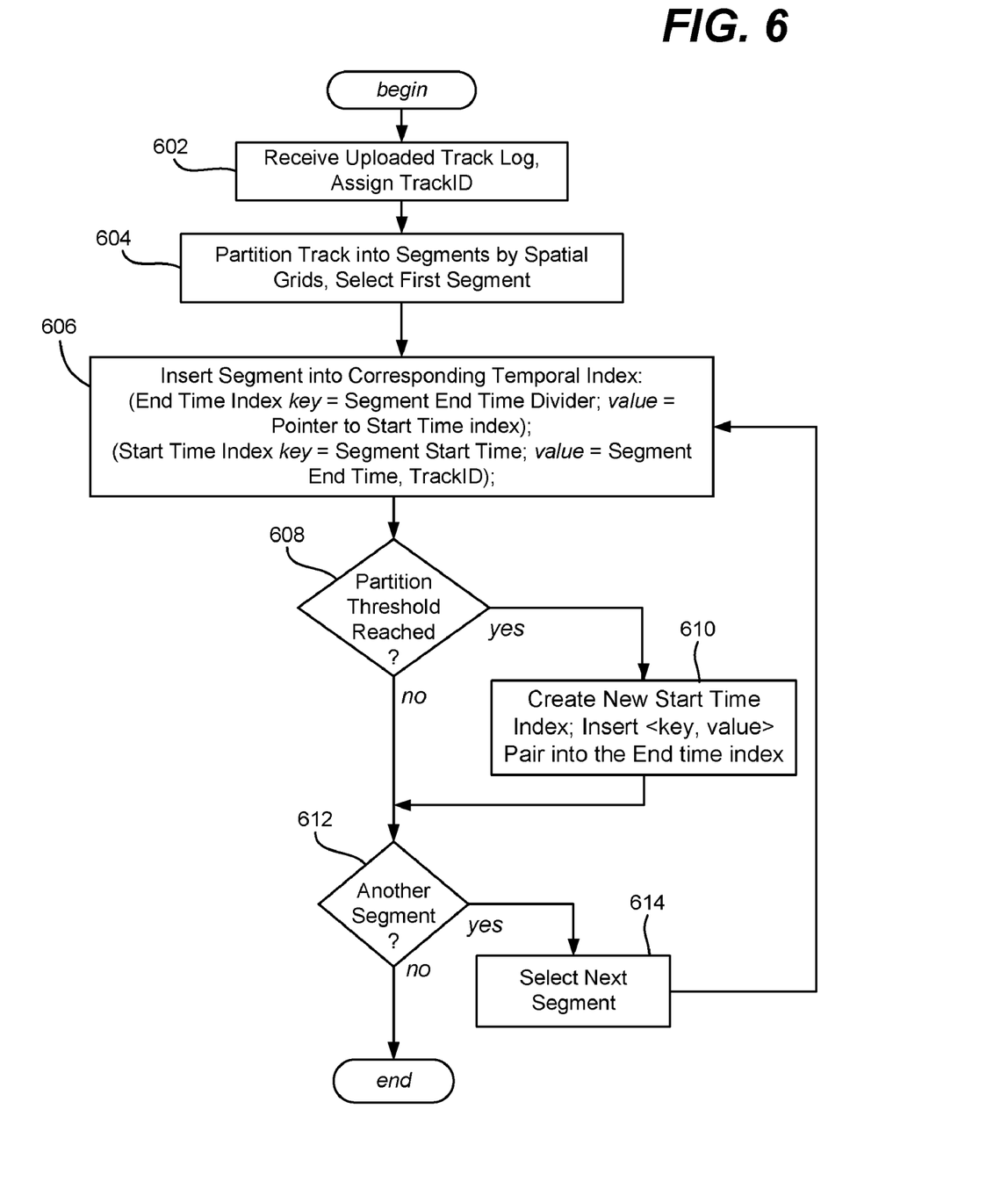
FIG. 6 is a flow diagram showing example steps taken to insert entries corresponding to GPS data into one or more CSE-tree structures

By way of a summary of insertion, as generally represented by the example flow diagram of FIG. 6, each uploaded GPS track log (e.g., log data 110) is assigned a trackID (unique relative to other tracks) when it enters the system (step 602). In order to insert a track into the index, the track is partitioned into segments by spatial grids (step 604), as in FIG. 3. For example, partitioning may be accomplished very efficiently using a known hashing technique. Then each segment is inserted into the temporal index of the corresponding spatial grid, as generally represented by step 606 and described below.

Figure 5A:
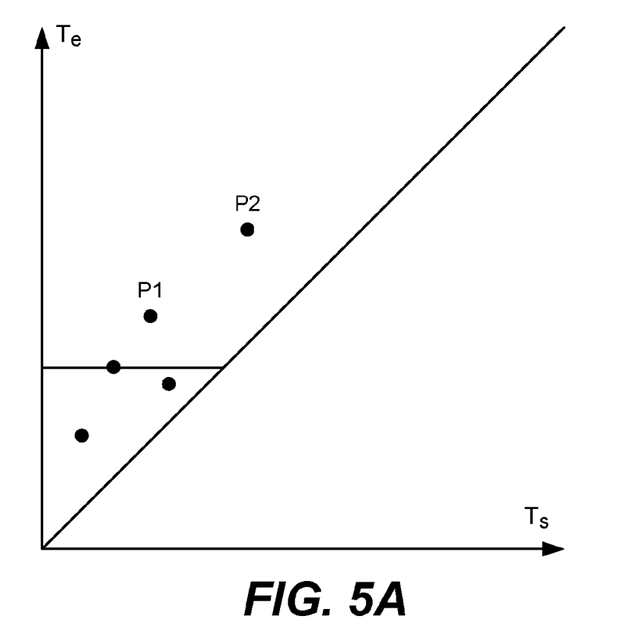
FIGS. 5A and 5B are representations of a set of segments represented by points inserted into a CSE-tree structure.
Figure 5B:
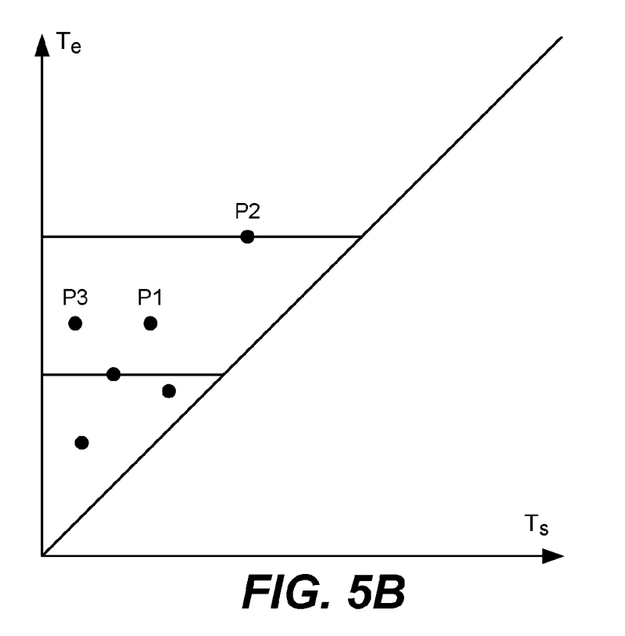

More particularly, a CSE-tree is essentially a two-dimensional index structure for the temporal index of each spatial grid. After a track is partitioned into segments by spatial grids, each segment is inserted into a corresponding temporal index, i.e., a CSE-tree associated with the spatial grid. In a two-dimensional plane where the horizontal coordinate denotes $T_s$ and the vertical coordinate denotes $T_e$, a track segment can be represented by a point on the plane as generally represented in FIGS. 5A and 5B.

In one example implementation, the end time index is implemented as a B+ tree for indexing <key, value> pairs. The key is the numerical value of the dividing lines of different groups, e.g., $t_0, t_1, t_2, t_3, \ldots, t_i$ and $t_{i+1}$ in FIG. 4. The value is a pointer to start time index, e.g., $S_0, S_1$ and $S_i$ of FIG. 5. The partitioning criterion is determined in the insertion process. For an index entry in the end time index E whose key is $t_i$, the entry covers any track segments whose end time $T_e$ is between $[t_i, t_{i+1})$ in the spatial grid; the entry's value is the pointer to its start time index $S_i$.

In one example implementation, the start time index is also organized as a B+ tree structure of <key, value> pairs. The key corresponds to the start time $T_s$ of a segment, and the value is the $<T_e$, trackID> pairing of the segment.

A parameter used in the insertion process is a partition threshold T. To this end, a dividing line in the end time dimension is defined (logically "drawn") when the number of items in the last start time index reaches the partition threshold T. Upon the insertion of a new track segment, the CSE-tree looks up the end time index with $T_e$ to find the largest key smaller than $T_e$. The corresponding value of the <key, value> pair is the pointer to a start time index. Then the start time index is updated using $T_s$ as a key and the value $<T_e$, trackID>. The last start time index is then checked to see if the number of items in this index exceeds the partition threshold T (step 608). If so, at step 610 (e.g., by calling a routine), a new start time index is created, with a <key, value> pair inserted into the end time index, in which the key is the maximum $T_{end}$ in the last start time index, and the value is the pointer to the newly created start time index.

Steps 612 and 614 repeat the process for other segments.

FIGS. 5A and 5B generally illustrate the insertion process, which in this example operates with the partition threshold T equal to three. When the first two points (P1, P2) in the last division are inserted, no partition line is drawn (FIG. 5A). When a third point (P3) is processed, after it is inserted into a corresponding start time index, the item number in the last start time index reaches the partition threshold T. Thus, a new dividing line is drawn and a new start time index is created. The numerical value of the dividing line equals the maximum value of $T_e$ in the last start time index (P2's end time $T_e$). The insertion mechanism 104 then inserts an end time index with a <key, value> pair whose key is the value of P2's $T_e$ and whose value is a pointer to the newly created start time index.

Figure 7:
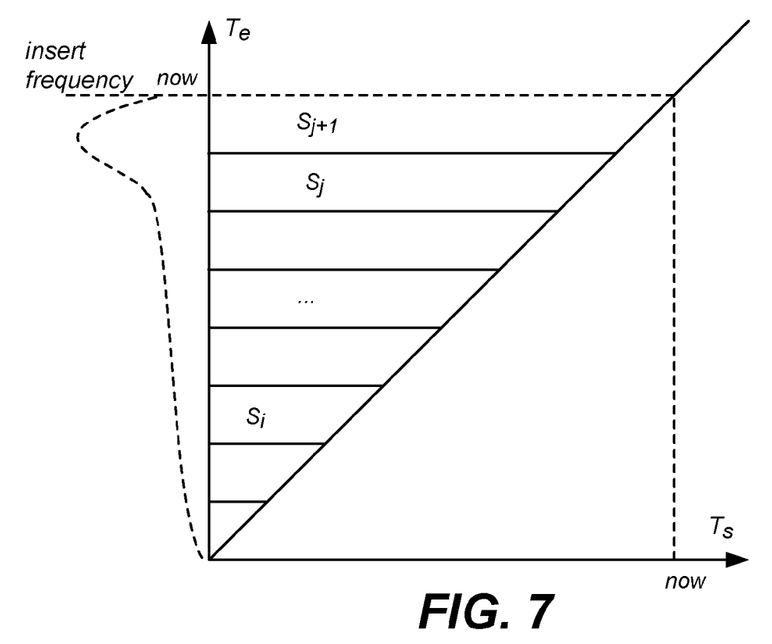
FIG. 7 is a representation of inserting CSE entries corresponding to GPS data into one or more CSE-tree structures over time.

The insertion logic can be further optimized by an analysis of distribution of insertion frequency. In FIG. 7, due to the way users generally update data (based on $T_{int}$), the portion of data whose end time is near "now" is updated more frequently. Therefore, the insertion logic may check the last few start time indexes such as $S_{j+1}$ and $S_j$. If the new insertion can be inserted into the last few start time indexes, then the cost of searching the end time index may be avoided.

Figure 8:
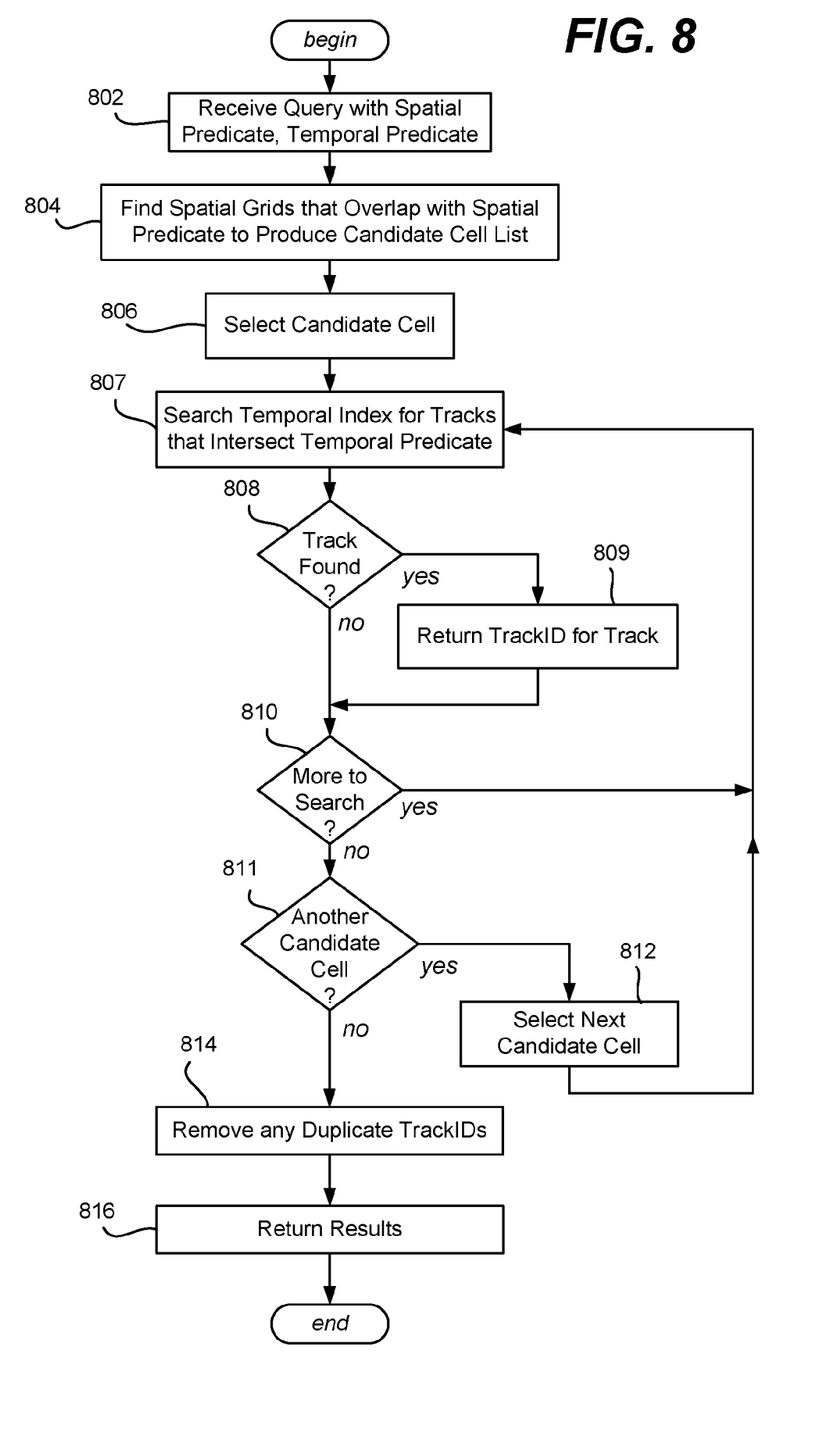
FIG. 8 is a flow diagram showing example steps taken to search CSE-tree structures given spatio-temporal input predicates.

Turning to various aspects related to query handling by the search logic 102 (FIG. 1), and as generally represented by the example steps in FIG. 8, to execute a received query (step 802), the spatial grids that overlap with the query's spatial information (predicate) are retrieved, producing a candidate cell list (step 804). More particularly, a spatio-temporal query includes both spatial and temporal predicates. The spatial predicate specifies a rectangular region, e.g., represented by its four boundaries. The temporal predicate specifies a time span between the minimum and the maximum temporal boundaries of the query, symbolized as $Time_{min}$ and $Time_{max}$.

For each cell in candidate cell list, its local temporal index is searched to find tracks that intersect the temporal predicate, with a trackID returned for each such track, as generally represented via steps 806 through 812. Then, at step 814, trackIDs from different cells are merged to remove any duplicates to provide a final result (step 816).

Figure 9:
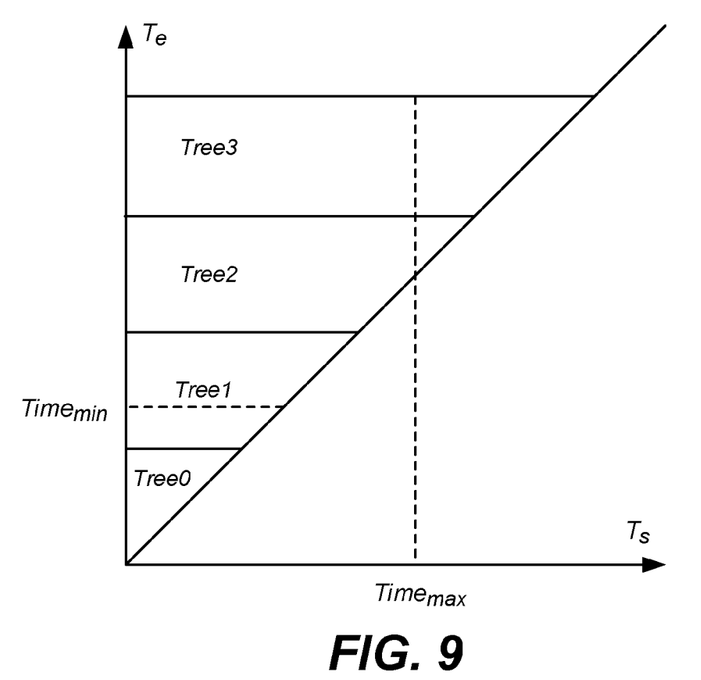
FIG. 9 is a representation of a CSE-tree search operation.

FIG. 9 further exemplifies a CSE-tree search operation. In a CSE-tree, in order to find the GPS tracks that intersect with the temporal predicate of a given query, the end time index is looked up with $Time_{min}$ to get the start time indexes that contain tracks whose end time is greater than $Time_{min}$. In the example of FIG. 9, given a query with $<Time_{min}, Time_{max}>$, Tree1, Tree2 and Tree3 are returned. $Time_{max}$ is then used to look up each start time index to find the tracks whose start time is less than $Time_{max}$. Any undesired tracks in the start time indexes that intersect with $Time_{min}$ are filtered out, e.g., in FIG. 9, Tree1 contains some tracks whose $T_e$ is less than $Time_{min}$, and those tracks are thus filtered out before returning the results.

Figure 10A:
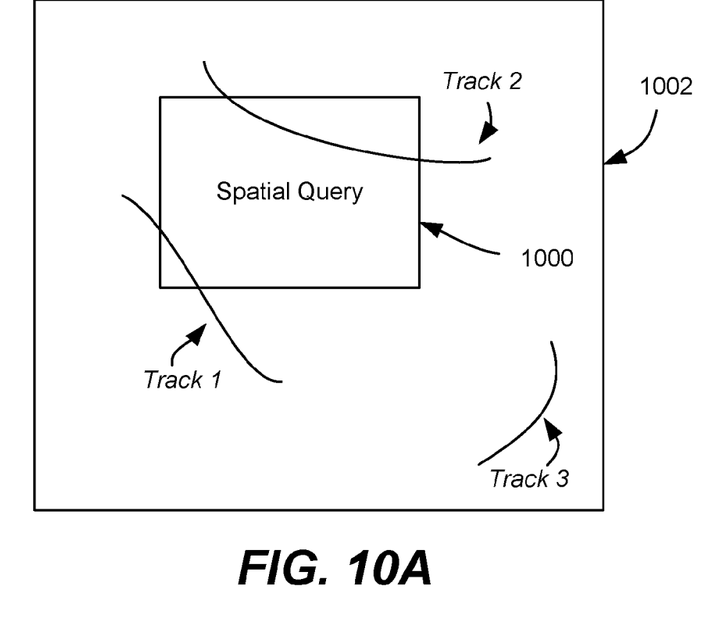
FIGS. 10A and 10B are representations of spatial querying and temporal querying for tracks.
Figure 10B:
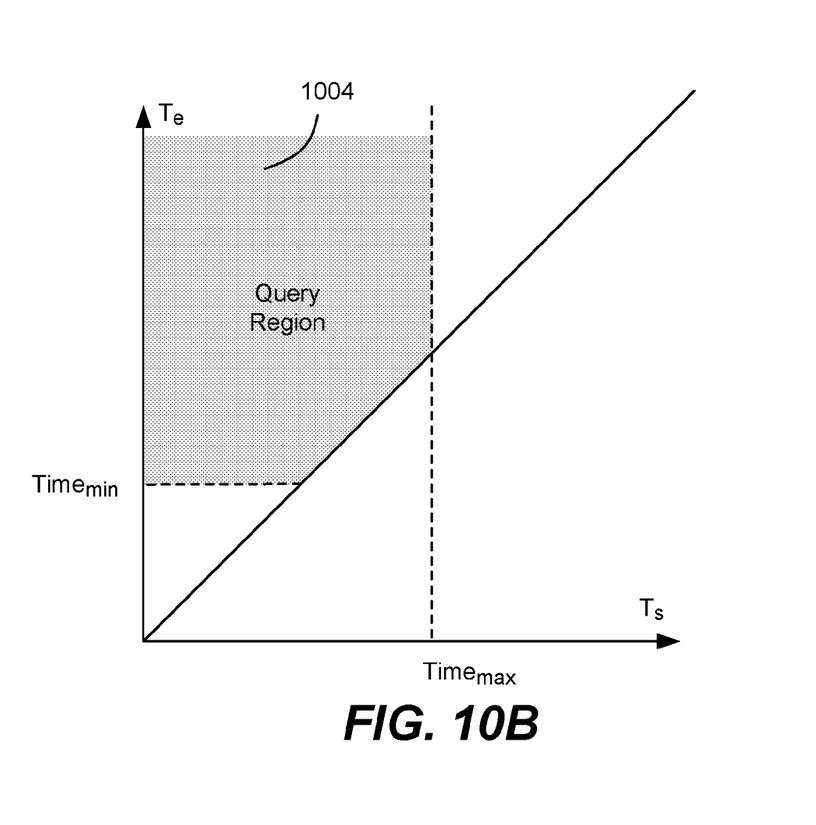

By way of another example, as generally represented in FIGS. 10A and 10B, for the spatial predicate, the index retrieves any tracks that overlap with the query's spatial input. In FIG. 10A, the spatial query retrieves the tracks that intersect with a spatial query input area 880 (of a larger area 1002), such as Track1 and Track2, but not Track 3. For a temporal predicate, the desired result is to retrieve the GPS track logs that satisfy:

$$T_e > Time_{min}, T_s > Time_{max} \quad (3)$$

As described above, on a two-dimensional plane in which the horizontal axis denotes $T_s$ and vertical axis denotes $T_e$, a track can be represented as a point on the plane. Therefore, as represented in FIG. 10B, a temporal query specifying $<Time_{min}, Time_{max}>$ retrieves the points that fall in the gray "Query Region" part 1004 of the plane.

Figure 11:
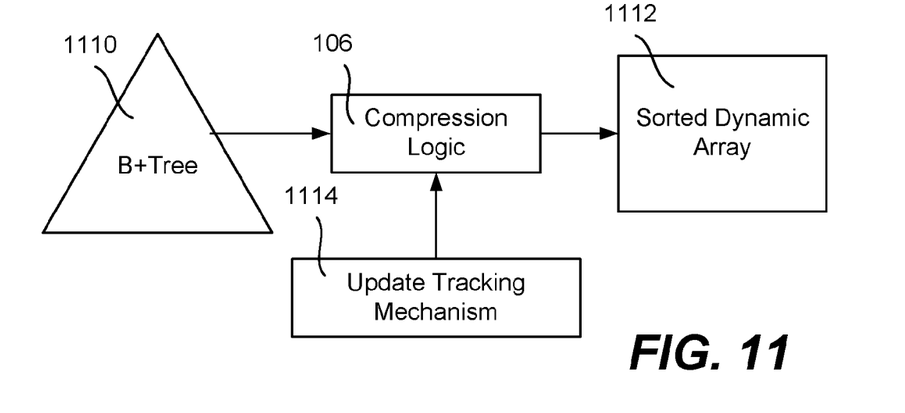
FIG. 11 is a representation of example components for compressing a CSE-tree.

Turning to aspects related to compression via the compression logic 106, it may be observed that for different tracks, the frequency of new updates is different. In general, people tend to upload GPS logs from their recent past more frequently than the GPS logs of their distant past. For instance, users are more likely to upload GPS track logs of today or yesterday rather than those of months ago.

This knowledge may be used to trade off efficiency versus storage resources, that is, to use a highly efficient but large data structure for frequently updated groups of segments, and a less-efficient but more compact data structure for rarely updated groups. A last update timestamp or frequency counter or the like may be maintained for each group, with different indexing strategies used according to each group's update frequency. In one example implementation, for frequently updated groups, tree structures such as B+ trees, B-trees, R-trees, binary trees and so on may be used, which are more efficient in insertion operations, but correspond to a large index size. For a rarely updated group an array structure is used, such as a dynamic array, grow-able array, array list, dynamic table and so forth. This reduces index size, and while less efficient, does not generally incur worse insertion and query performance because of the rarity of updates.

In one example implementation, the start time index and end time index are implemented using a B+ tree for efficiency. However, as data accumulate, the tree structure grows larger. Thus, while a B+ tree provides high performance and thus is advantageous for frequent updates, such performance at the expense of storage space is unnecessary for archived data that is rarely (if ever) updated. According to user behavior analysis, while it is possible to upload a GPS track logged long ago, this is a rare occurrence, whereby a higher insertion cost for such archived data does not significantly affect overall performance. As a result, the index for archive data only needs to provide a rapid query response, but does not require efficient insertion.

To reduce storage space requirements at the cost of reduced (but unnecessary) efficiency, the B+ tree index for archive data that is uploaded long time ago may be replaced by another data structure, such as a simple dynamic array structure. This greatly reduces the index size. An example is represented in FIG. 7, in which the current time "now" is shown as a broken line that is constantly moving as time elapses. $S_i$, $S_j$ and $S_{j+1}$ represent three start time indexes; $S_j$ and $S_{j+1}$ have a relatively high update frequency while $S_i$ has a low update frequency. Therefore, $S_j$ and $S_{j+1}$ may be maintained using B+ trees, while $S_i$ is maintained in a sorted dynamic array.

Figure 12:
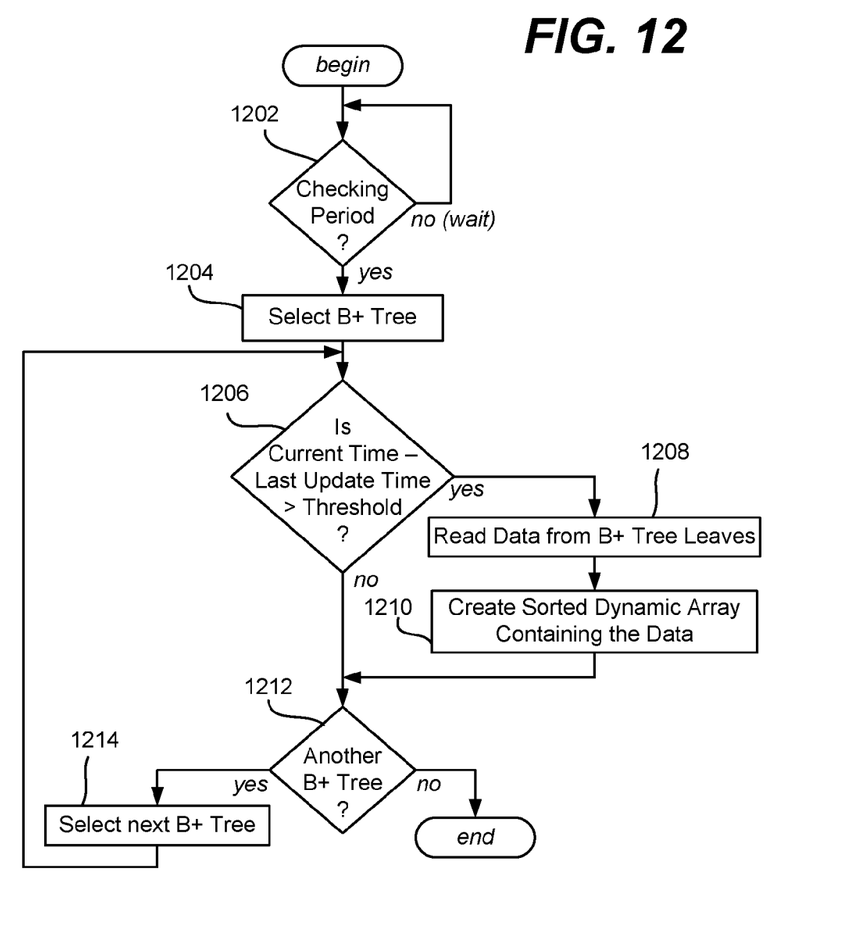
FIG. 12 is a flow diagram showing example steps taken to compress a CSE-tree structure.

The operation that transforms a B+ tree into a dynamic array is referred to herein as "compression" and is generally represented in FIGS. 11 and 12 using the example of a B+ tree 1110 being converted by the compression logic 106 to a sorted dynamic array 1112. Because this compression operation is relatively time-consuming, it may be carried out in an off-line manner to ensure high index performance.

In general, as represented by an update tracking mechanism 1114, a timestamp or similar data is maintained for each start time index that represents the last time that corresponding start time index was updated. It is alternatively feasible to track frequency, e.g., how many times each start time index is updated over a certain duration.

As represented in FIG. 12, a process checks these time flags periodically (step 1202), and for each B+ tree (steps 1204, 1212 and 1214), when the difference between the current time and the time of last update exceeds a threshold (step 1206), i.e., the start time index has not been updated for a long time, it is concluded that future updates on the selected B+ tree index are unlikely; (it is alternatively feasible to evaluate a frequency to make a similar determination). If so, compression takes place, e.g., a "compress" routine is called to transform the B+ tree index to a dynamic array. As represented by steps 1208 and 1210, compression is implemented by reading the data from the B+ tree leaves and creating a new sorted dynamic array containing these data.

Turning to another aspect related to accumulation of GPS data, when viewing $T_{int}$ as a random variable, it can be seen that that it has a skewed distribution. The reasons generally include that people are more likely to upload GPS data of the recent past than the distant past, and also that people need some time to transfer the log data from GPS device to a website. The distribution of $T_{int}$ is thus likely a combination of these two characteristics.

As a result, the distribution of $T_{int}$ can be inferred from an analysis on users' upload behavior on other systems, such as when uploading photographs. In one example, $T_{int}$ is assumed to follow a Rayleigh distribution.

User behavior with respect to uploading GPS tracks can be simulated by five steps:

1. Generate a series of $T_{up}$ using a Poisson process.
2. Generate $T_{int}$ by Rayleigh distribution, and deduce $T_e$ by based on equation (2), namely $T_e = T_{up} - T_{int}$.
3. Generate $T_{dur}$ by normal distribution.
4. Generate $T_s$ based on equation (1), namely $T_s = T_e - T_{dur}$.
5. Using $T_s$ and $T_e$ as the first and last time stamps, GPS points of a track may be generated a GSTD method, such as described in the reference by Y. Theodoridis, J. R. O. Silva, M. A. Nascimento, *On the Generation of Spatiotemporal Datasets*, Advances in Spatial Databases, 6th International Symposium, Lecture Notes in Computer Science, Springer, page 147-164, 1999.

Exemplary Operating Environment

Figure 13:
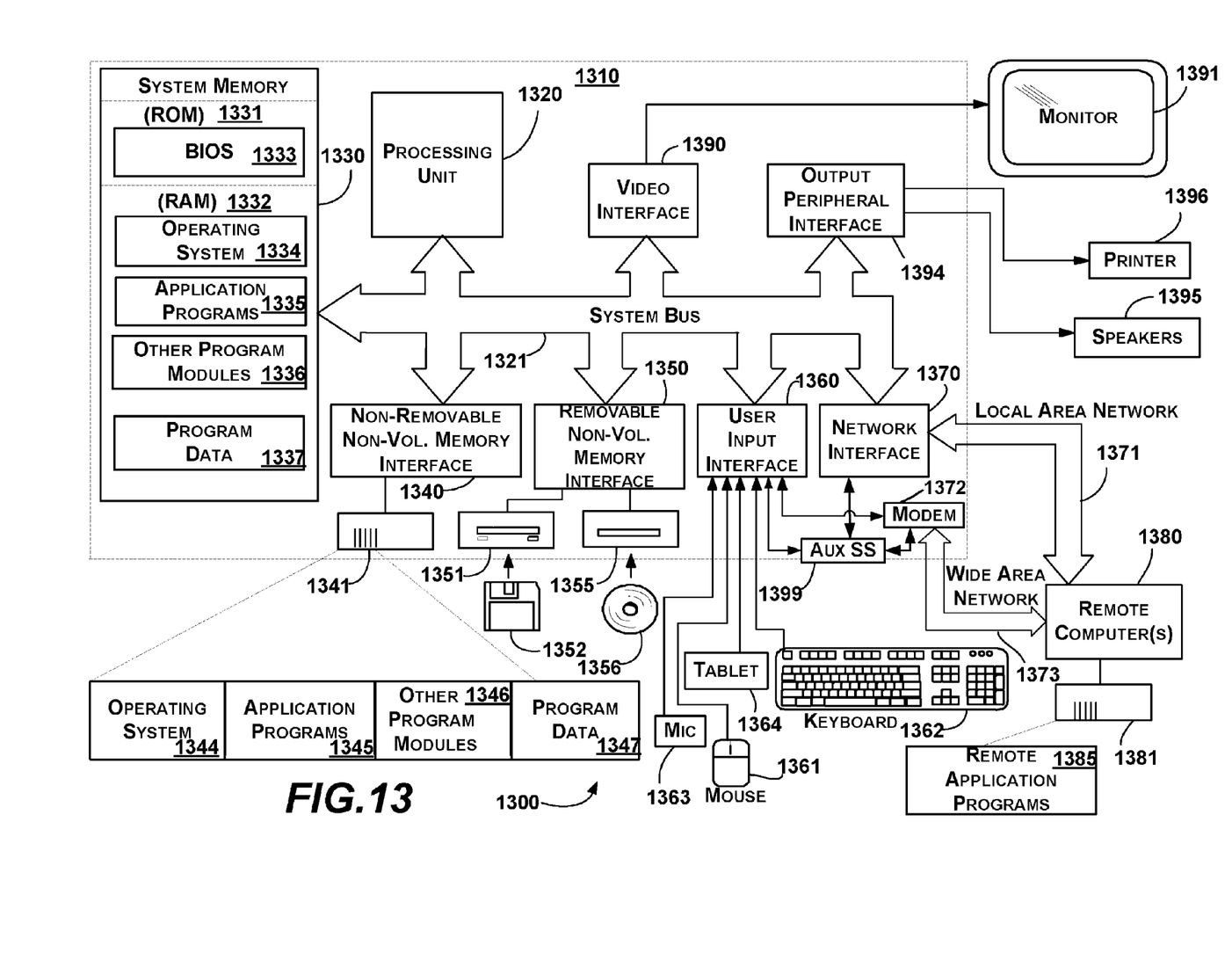
FIG. 13 shows an illustrative example of a computing environment into which various aspects of the present invention may be incorporated.

FIG. 13 illustrates an example of a suitable computing and networking environment 1300 on which the examples of FIGS. 1-12 may be implemented. For example, the various logic of FIG. 1 may be implemented in the computer system 1310. The computing system environment 1300 is only one example of a suitable computing environment and is not intended to suggest any limitation as to the scope of use or functionality of the invention. Neither should the computing environment 1300 be interpreted as having any dependency or requirement relating to any one or combination of components illustrated in the exemplary operating environment 1300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 13, an exemplary system for implementing various aspects of the invention may include a general purpose computing device in the form of a computer 1310. Components of the computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1310 typically includes a variety of computer-readable media. Computer-readable media can be any available media that can be accessed by the computer 1310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336 and program data 1337.

The computer 1310 may also include other removable/non-removable, volatile/nonvolatile computer storage media. By way of example only, FIG. 13 illustrates a hard disk drive 1341 that reads from or writes to non-removable, nonvolatile magnetic media, a magnetic disk drive 1351 that reads from or writes to a removable, nonvolatile magnetic disk 1352, and an optical disk drive 1355 that reads from or writes to a removable, nonvolatile optical disk 1356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

The drives and their associated computer storage media, described above and illustrated in FIG. 13, provide storage of computer-readable instructions, data structures, program modules and other data for the computer 1310. In FIG. 13, for example, hard disk drive 1341 is illustrated as storing operating system 1344, application programs 1345, other program modules 1346 and program data 1347. Note that these components can either be the same as or different from operating system 1334, application programs 1335, other program modules 1336, and program data 1337. Operating system 1344, application programs 1345, other program modules 1346, and program data 1347 are given different numbers herein to illustrate that, at a minimum, they are different copies. A user may enter commands and information into the computer 1310 through input devices such as a tablet, or electronic digitizer, 1364, a microphone 1363, a keyboard 1362 and pointing device 1361, commonly referred to as mouse, trackball or touch pad. Other input devices not shown in FIG. 13 may include a joystick, game pad, satellite dish, scanner, or the like. These and other input devices are often connected to the processing unit 1320 through a user input interface 1360 that is coupled to the system bus, but may be connected by other interface and bus structures, such as a parallel port, game port or a universal serial bus (USB). A monitor 1391 or other type of display device is also connected to the system bus 1321 via an interface, such as a video interface 1390. The monitor 1391 may also be integrated with a touch-screen panel or the like. Note that the monitor and/or touch screen panel can be physically coupled to a housing in which the computing device 1310 is incorporated, such as in a tablet-type personal computer. In addition, computers such as the computing device 1310 may also include other peripheral output devices such as speakers 1395 and printer 1396, which may be connected through an output peripheral interface 1394 or the like.

The computer 1310 may operate in a networked environment using logical connections to one or more remote computers, such as a remote computer 1380. The remote computer 1380 may be a personal computer, a server, a router, a network PC, a peer device or other common network node, and typically includes many or all of the elements described above relative to the computer 1310, although only a memory storage device 1381 has been illustrated in FIG. 13. The logical connections depicted in FIG. 13 include one or more local area networks (LAN) 1371 and one or more wide area networks (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the user input interface 1360 or other appropriate mechanism. A wireless networking component 1374 such as comprising an interface and antenna may be coupled through a suitable device such as an access point or peer computer to a WAN or LAN. In a networked environment, program modules depicted relative to the computer 1310, or portions thereof, may be stored in the remote memory storage device. By way of example, and not limitation, FIG. 13 illustrates remote application programs 1385 as residing on memory device 1381. It may be appreciated that the network connections shown are exemplary and other means of establishing a communications link between the computers may be used.

An auxiliary subsystem 1399 (e.g., for auxiliary display of content) may be connected via the user interface 1360 to allow data such as program content, system status and event notifications to be provided to the user, even if the main portions of the computer system are in a low power state. The auxiliary subsystem 1399 may be connected to the modem 1372 and/or network interface 1370 to allow communication between these systems while the main processing unit 1320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
using a computing device for:
processing GPS data into a track of segments as partitioned by a spatial grid such that each segment has a corresponding grid cell; and
for each segment, inserting data representative of that segment into a temporal index associated with the grid cell corresponding to that segment, including creating an entry for that segment based on an end time of that segment and an entry based on a start time of that segment;
searching for at least one track of GPS data using the temporal index.

2. The method of claim 1 further comprising,
searching for at least one resulting track based upon an input spatial predicate and temporal predicate, including by determining which spatial grid cell or cells are candidate cells for the resulting track, and for each candidate cell, accessing its associated temporal index to find any track or tracks that correspond to the temporal predicate.

3. The method of claim 1 wherein creating the entry for that segment based on the end time comprises using the end time to determine a key to an end time index, with a value associated with the key comprising a pointer to a start time index containing a start time entry for that segment.

4. The method of claim 1 wherein creating the entry for that segment based on the start time comprises using the start time as a key to a start time index, with a value associated with the key comprising an end time of that segment and an identifier of the track.

5. The method of claim 4 wherein the end time index indexes a group of segments each within a time range, and further comprising, creating a new start time index when a number of segments in the group exceed a partition threshold.

6. The method of claim 1 further comprising, compressing the temporal index from one data structure into a data structure that uses less storage space.

7. The method of claim 1 further comprising, determining whether the temporal index has a low likelihood of being updated, and if so, compressing the temporal index from one data structure into a data structure that uses less storage space.

8. The method of claim 7 wherein determining whether the temporal index has a low likelihood of being updated comprises evaluating a time of last update of the temporal index.

9. The method of claim 1 wherein creating the entry for the segment based on the end time comprises using the end time to determine a key to an end time index, with a value associated with the key comprising a pointer to a start time index containing a start time entry for that segment, and wherein creating the entry for that segment based on the start time comprises using the start time as a key to the start time index, with a value associated with the key comprising the end time of that segment and an identifier of the track.

10. In a computing environment, a system comprising:
a general purpose computing device;
a computer program comprising program modules executable by the general purpose computing device, comprising:
an insertion logic module that builds compressed start-end trees from sets of GPS data;
a search logic module that searches among compressed start-end trees to find one or more tracks corresponding to a subset of GPS data that match a spatio-temporal input request; and
compression logic that converts at least one of the compressed start-end trees from one data structure type to another based on a likelihood of each compressed start-end tree being updated according to subsequently-received GPS data.

11. The system of claim 10 wherein each compressed start-end tree comprises a B+ tree, a B-tree, R-tree, or a binary tree, and wherein the compression logic converts a B+ tree, a B-tree, R-tree, or binary tree into an array structure or table structure.

12. The system of claim 10 wherein each compressed start-end tree comprises a B+ tree, and wherein the compression logic converts each B+ tree to a dynamic array when the likelihood of that compressed start-end tree being updated is low.

13. The system of claim 10 wherein the insertion mechanism determines segments of a track according to spatially partitioned cells, and for each segment, inserts start and end time data representative of that segment into a particular compressed start-end tree associated with the cell corresponding to that segment.

14. The system of claim 10 wherein each compressed start-end tree comprises an end time index that contains the end time data for a plurality of segments.

15. The system of claim 14 wherein each compressed start-end tree comprises a plurality of start time indexes, with each segment grouped into an associated one of the indexes based on its end time, and wherein the end time index contains a reference to the one start time index that is associated with each segment.

16. One or more computer-readable storage devices having stored thereon a data structure, comprising:
an end time index that contains entries corresponding to a plurality of end times for segments that have common spatial relationships;
a plurality of start time indexes, each start time index containing entries for start times of segments that have end times within a time range corresponding to that index; and
wherein the data structure may be identified relative to other data structures based on spatial data, and searched via temporal data to determine from the start times and end times one or more tracks that are associated with one or more segments that correspond to the temporal data.

17. The one or more computer-readable storage devices of claim 16 wherein the end time of each segment determines a key in the end time index that is used to determine which start time index is associated with that segment.

18. The one or more computer-readable storage devices of claim 16 wherein the start time of each segment is used as a key to the start time index to determine which track is associated with that segment.

19. The one or more computer-readable storage devices of claim 16 wherein the start time of each segment is used as a key to the start time index to determine the end time of that segment.

20. The one or more computer-readable storage devices of claim 16 wherein the data structure may be converted from a tree structure to an array or table structure.

* * * * *